(12) United States Patent
Baier

(10) Patent No.: US 10,485,217 B2
(45) Date of Patent: Nov. 26, 2019

(54) CASSETTE BRUSH

(71) Applicant: Alfred Baier, Rottach-Egern (DE)

(72) Inventor: Alfred Baier, Rottach-Egern (DE)

( * ) Notice: Subject to any disclaimer, the term of this patent is extended or adjusted under 35 U.S.C. 154(b) by 440 days.

(21) Appl. No.: 15/113,273

(22) PCT Filed: Dec. 23, 2014

(86) PCT No.: PCT/EP2014/079275
§ 371 (c)(1),
(2) Date: Jul. 21, 2016

(87) PCT Pub. No.: WO2015/110244
PCT Pub. Date: Jul. 30, 2015

(65) Prior Publication Data
US 2016/0330933 A1    Nov. 17, 2016

(30) Foreign Application Priority Data

Jan. 21, 2014    (DE) .......................... 10 2014 100 615

(51) Int. Cl.
| | |
|---|---|
| *A01K 13/00* | (2006.01) |
| *A46B 3/18* | (2006.01) |
| *A46B 7/04* | (2006.01) |
| *A46B 13/00* | (2006.01) |
| *A46B 15/00* | (2006.01) |
| *A46B 13/02* | (2006.01) |

(52) U.S. Cl.
CPC .............. *A01K 13/002* (2013.01); *A46B 3/18* (2013.01); *A46B 7/04* (2013.01); *A46B 13/001* (2013.01); *A46B 13/005* (2013.01); *A46B 13/02* (2013.01); *A46B 15/0053* (2013.01); *A46B 2200/102* (2013.01); *A46B 2200/1093* (2013.01)

(58) Field of Classification Search
CPC ................................. A01K 13/002; A46B 3/18
USPC .................................................. 119/609, 610
See application file for complete search history.

(56) References Cited

U.S. PATENT DOCUMENTS

| | | | | |
|---|---|---|---|---|
| 793,234 | A * | 6/1905 | Scanlan .............. | A47L 11/4047 119/609 |
| 1,227,047 | A * | 5/1917 | Gray ................... | A47L 11/4047 119/603 |
| 1,335,441 | A * | 3/1920 | Juricich .............. | A01K 13/002 119/609 |

(Continued)

FOREIGN PATENT DOCUMENTS

| | | |
|---|---|---|
| CH | 293 951 A | 10/1953 |
| DE | 194 17 700 A1 | 11/1996 |

(Continued)

OTHER PUBLICATIONS

European Written Opinion dated Oct. 4, 2016 for Application No. EP 14830528.7, 5 pgs.

(Continued)

*Primary Examiner* — Monica L Williams
(74) *Attorney, Agent, or Firm* — Frost Brown Todd LLC

(57) ABSTRACT

The invention relates to a brush device for brushing, combing, grooming, massaging or detangling, in particular for the coat and skin care of domestic animals, comprising a cassette holder for receiving a brush cassette having a drivable brush belt. The cassette holder and the brush cassette are designed in such a way that the brush cassette can be inserted into, and removed again from, the cassette holder.

8 Claims, 9 Drawing Sheets

(56) References Cited

U.S. PATENT DOCUMENTS

| | | | | |
|---|---|---|---|---|
| 1,764,626 | A | * | 6/1930 | Heckman .............. A01K 13/002 |
| | | | | 119/609 |
| 4,083,327 | A | * | 4/1978 | Dowdy ................ A01K 13/002 |
| | | | | 119/601 |
| 4,362,173 | A | * | 12/1982 | Blinman .............. A01K 13/002 |
| | | | | 119/609 |
| 4,928,346 | A | * | 5/1990 | Elson ......................... A47L 5/26 |
| | | | | 15/329 |
| 5,207,183 | A | * | 5/1993 | Praschnik ............ A01K 13/002 |
| | | | | 119/609 |
| 7,530,136 | B1 | * | 5/2009 | Ball ...................... A46B 5/0033 |
| | | | | 15/103 |
| 2008/0256743 | A1 | * | 10/2008 | Lam ...................... A47L 9/0494 |
| | | | | 15/329 |
| 2009/0107413 | A1 | * | 4/2009 | Shiloni ................ A01K 13/002 |
| | | | | 119/609 |
| 2012/0260864 | A1 | * | 10/2012 | Jonsson ............... A01K 13/001 |
| | | | | 119/609 |
| 2013/0298340 | A1 | * | 11/2013 | Suwanbutr ............. A61C 17/26 |
| | | | | 15/23 |

FOREIGN PATENT DOCUMENTS

| | | |
|---|---|---|
| DE | 20 2005 003023 U1 | 6/2005 |
| DE | 20 2008 002071 U1 | 7/2009 |
| DE | 10 2014 100 615 B3 | 2/2015 |
| JP | 2001-120098 A | 5/2001 |
| WO | WO 2015/110244 A3 | 10/2015 |

OTHER PUBLICATIONS

International Search Report and Written Opinion dated Sep. 10, 2015 for Application No. PCT/EP2014/079275, 28 pgs.

* cited by examiner

CASSETTE BRUSH

FIELD OF THE INVENTION

The present invention relates to a brush device for brushing, combing, grooming, massaging or detangling, in particular for the coat and skin care of domestic animals, and to a brush system having such a brush device with exchangeable brush cassettes.

BACKGROUND OF THE INVENTION

Japanese patent application JP 20011 20098 A discloses a device for animal hair care. The device has a brush belt which revolves around two rollers and is equipped with care elements on the surface thereof. The brush belt is driven by means of a drive motor which is installed between the rollers. A suction device sucks off animal hair which adheres to the care elements of the belt.

The problem addressed by the present invention is that of providing an improved brush device for brushing, combing, grooming, massaging or detangling, in particular for the coat and skin care of domestic animals.

SUMMARY OF THE INVENTION

The present invention relates to a brush device including a cassette holder for receiving a brush cassette with a drivable brush belt. The cassette holder and the brush cassette are designed in such a way that the brush cassette can be inserted into, and removed again from, the cassette holder. As a result, a brush cassette can easily be exchanged with another brush cassette. For example, it is possible, as required, to insert brush cassettes having different brush belts that are optimized for the particular care treatments. Furthermore, it is possible to easily replace defective or worn brush belts.

The cassette holder can be a housing made of metal or plastics, which is fully or partially open on one or more sides. As a result, a brush cassette can easily be inserted into, or removed from, the cassette holder.

The brush belt is preferably made as a flat belt in the form of a continuous belt and can be produced from a flexible plastic material. The brush belt brushes in the longitudinal direction, similar to the natural brush movements when hair is brushed. The length of the brush belt is preferably designed so as to realize a sufficiently long longitudinal movement of hair to obtain the desired care success. For example, a belt length of about 30 cm is preferred for the care of long-haired dogs so as to achieve a longitudinal movement of the hair over a distance of about 10 cm. Depending on the case of application, the belt length can also be longer or shorter.

When the brush belt is made of an elastic material, retensioning—which might otherwise be necessary—can be avoided.

The brush belt is equipped with trimming material, e.g. bristles, teeth or pins or the like. The trimming material can be spring steel wire which has a round body and a U-shaped bend. The spring steel wire can have a horizontal bend in the horizontal lower central part of the U-shaped wire, and/or can be bent on the ends. The spring steel wire can also have rounded ends. Alternatively, the trimming material can also be plastics, natural fiber, other metals or combinations of said materials.

The brush belt can be made with or without milled-in structures, such as holes, transverse grooves, grooves or the like, which facilitate the attachment of the trimming material.

The brush belt is preferably made as a revolving brush belt (in the manner of a "conveyor belt") and is driven via a drive axle supported in the brush cassette. The brush holder supports a drive pin for the mechanical coupling of this drive axle. The drive pin meshes with the drive axle when the brush cassette is inserted into the cassette holder. This serves to achieve a mechanical coupling of the brush cassette to the cassette holder via which the driving force can be transmitted from the drive pin to the drive axle. The drive pin can be made e.g. as an external hexagon. A person skilled in the art might also realize the coupling in an alternative way, e.g. by providing the drive axle of the brush cassette with a hexagonal pin which meshes with a drive device (transmission, motor shaft or the like). What matters here is that when a brush cassette is inserted into the cassette holder the drive axle of the brush cassette is coupled to a drive motor or transmission in a detachable manner, such that a driving force of a drive motor, optionally geared-down by means of the gearing-up effect of a transmission, is transmitted to the drive axle of the brush cassette.

Furthermore, a drive motor can be attached to the cassette holder and drives the drive pin. This drive motor can be e.g. an electric motor or the like. The drive motor is preferably mounted on the cassette holder in such a way that it is fully or partially accommodated in the brush cassette when the brush cassette is inserted. Alternatively, the drive motor can also be attached to the outside of the cassette holder. The drive motor can be mounted directly or indirectly on the cassette holder.

The brush cassette advantageously has an opening which is designed to insert the drive motor into the brush cassette when the brush cassette is inserted into the cassette holder. The drive motor can be fully or partially inserted into the brush cassette through this opening in the brush cassette, as a result of which this motor is fully or partially accommodated in the interior of the brush cassette when the brush cassette is inserted into the cassette holder. A space-saving design of the brush device is realized in this way. For example, the opening can be provided between two rollers via which the brush belt runs. The opening can be disposed e.g. approximately in the center of the brush cassette so as to achieve a balanced weight distribution of the brush device.

The opening for receiving the drive motor can be designed in such a way that it allows an insertion of the drive motor into the brush cassette in a substantially form-fit fashion. A form-fit opening in the brush cassette is preferably made with some clearance to facilitate the insertion of the brush cassette into the cassette holder. Alternatively, the opening in the brush cassette can also have a different shape. For example, one side of the cassette holder might be fully or partially open, such that when the brush cassette is inserted into the cassette holder the drive motor is fully or partially inserted into the brush cassette through this open side.

Alternatively, the drive motor can also be positioned on the outside of the cassette holder. In this case, it is not necessary to provide the brush cassette with an opening in order to receive the drive motor.

The brush cassette preferably has two rollers which serve as revolving rollers and around which the brush belt runs. At least one of the rollers is mounted on the drive axle of the brush cassette as the driving roller, as a result of which the driving force of the drive motor is transmitted to this driving roller when the brush cassette is inserted. The driving roller can be designed so as to act as a friction clutch in the case of overload.

Furthermore, a transmission can be mounted on the cassette holder and couples the drive motor with the drive pin. This transmission can be mounted on an outer side of the cassette holder. The drive motor can be attached directly to, or be firmly mounted in, the cassette holder.

The cassette holder preferably has a recess which is designed to receive in form-fit fashion at least part of the brush cassette, as a result of which the brush cassette is held in a predetermined position when it is in the coupled state.

The brush device can also have a locking mechanism which serves to lock the brush cassette in the inserted state. This locking mechanism can be e.g. a locking screw.

The cassette holder can be open on one side, as a result of which the brush cassette can be inserted into, or removed again from, the cassette holder by a movement in the direction of the drive axle of the brush cassette.

The described brush device can be driven electrically. The brush device can be supplied by means of an electric cable with electric power which drives an electric motor.

A handle can be attached to the cassette holder, by means of which the brush device can be held and actuated. The cassette holder and handle might be made of several pieces or one piece. The cassette holder can preferably be operated via such a handle in one-handed fashion. Control elements, e.g. an on/off switch and/or a power regulator, can be provided on the handle and/or on the cassette holder.

A suction channel can be provided on one end of the cassette holder and offers a connection option for an external suction device, e.g. a household vacuum cleaner. Soiling, hair or other particles in the brush region can thus be vacuumed off continuously during brushing.

A brush system having a brush device as described above comprises a plurality of brush cassettes, all having different brush belts. The cassette holder of the brush device is designed to receive the plurality of brush cassettes in an exchangeable way. As a result, a brush cassette can easily be removed and be exchanged with another brush cassette. For example, it is possible by means of the brush system to insert, as required, brush cassettes having different brush belts, all optimized for special care treatments.

The brush device according to the invention and/or the brush system according to the invention can be used for straightening the topcoat, combing out and detangling the undercoat, combing out and vacuuming off dead hair, in particular when the coat changes, combing out and vacuuming off dirt particles and dandruffs and aerating and massaging the coat and the skin.

A brush belt according to an embodiment has a basic belt strip on which one or more comb elements are mounted in such a way that they are substantially perpendicular to the surface of the basic belt strip. A brush belt having one or more comb elements, is particularly suitable to thin out undercoat or remove died hair effectively and rapidly from the coat. The comb elements can consist of different materials and vary in shape, depending on the case of application (short-haired coat/long-haired coat). Four to six comb elements are preferably arranged on a brush belt. Furthermore, a plurality of bristle bundles can be provided on the brush belt strip and are attached to the basic belt strip between the comb elements.

Further aspects and features of the present invention result from the dependent claims, the appended drawings and the below description of preferred embodiments.

BRIEF DESCRIPTION OF THE DRAWING

Embodiments of the invention are now described by way of example and with reference to the appended drawings, wherein.

DESCRIPTION OF EMBODIMENTS

Figure 1A:
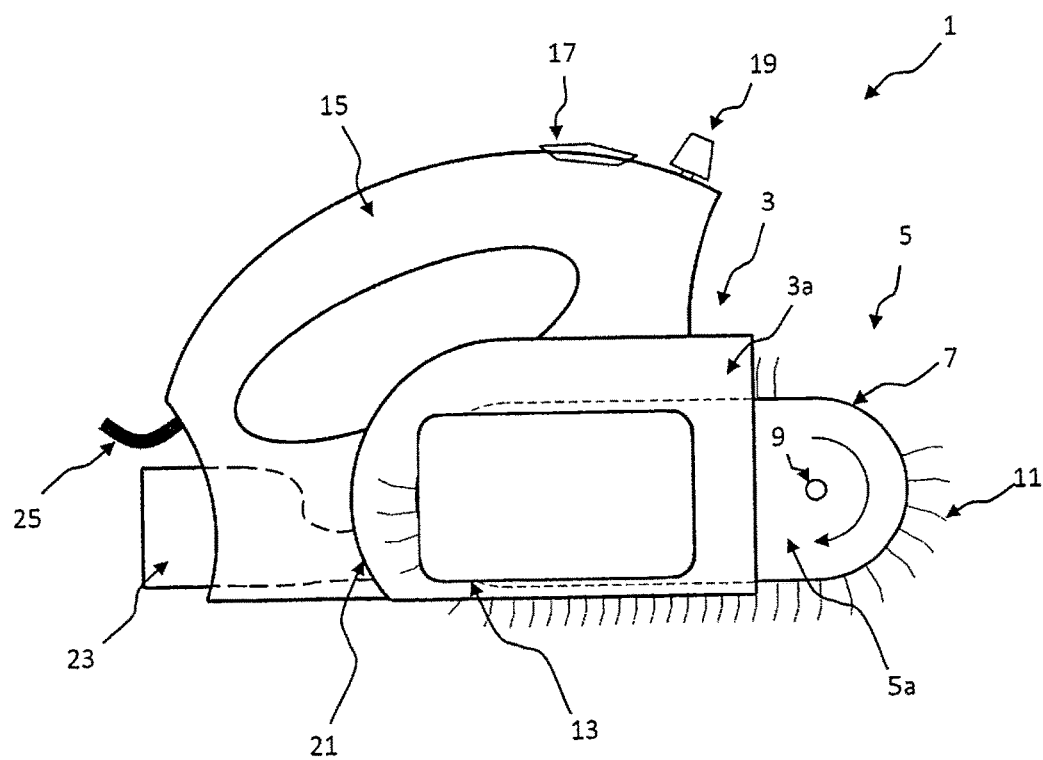
FIG. 1a shows a schematic diagram of an embodiment of the brush device according to the invention including a brush cassette and a cassette holder.

FIG. 1a shows by way of schematic diagram a side view of an embodiment of the brush device 1 according to the invention. A brush cassette 5, which is inserted into a cassette holder 3 and substantially one side wall 5a of which is shown, has a brush belt 7, which is made as a revolving flat belt. The rotary arrow in FIG. 1 outlines the revolving movement of the brush belt 7 around a revolving roller (43 in FIGS. 4a and 4b) which is rotatably mounted in the brush cassette 5 via a revolving roller axle 9. The brush belt 7 is equipped with fitting material 11 which is here made as bristles from spring steel wire. A transmission housing 13 is mounted on one side wall 3a of the cassette holder 3 and accommodates a transmission (not shown). The transmission couples a drive motor (31 in FIG. 1b) accommodated in the cassette holder 3 via a drive pin (33 in FIG. 1b) and a drive axle (35 in FIGS. 4a and 4b) to a driving roller (45 in FIGS. 4a and 4b). Furthermore, a handle 15 is attached to the cassette holder 3. The brush device 1 can be held by means of this handle. A switch 17 is mounted on the handle 15, said switch having three switch positions (forward-stop-reverse), by means of which the drive motor and thus the brush belt 7 can be changed into a forward operation, a stop operation and a reverse operation. The power of the drive motor 31 and thus the speed and/or the pulling force of the brush belt 7 can be regulated by means of a power regulator 19. A suction opening 21 is disposed on the rear end of the brush device 1 and opens into a suction channel 23 to which a suction device, such as a household vacuum cleaner, can be connected. Furthermore, an electric cable 25 exits the rear end of the brush device 1 and serves to provide the brush device 1 with electric power for the operation of the drive motor. The electric cable extends through the interior of the brush device 1 to the drive motor 31 to supply the latter with electric power.

Figure 1B:
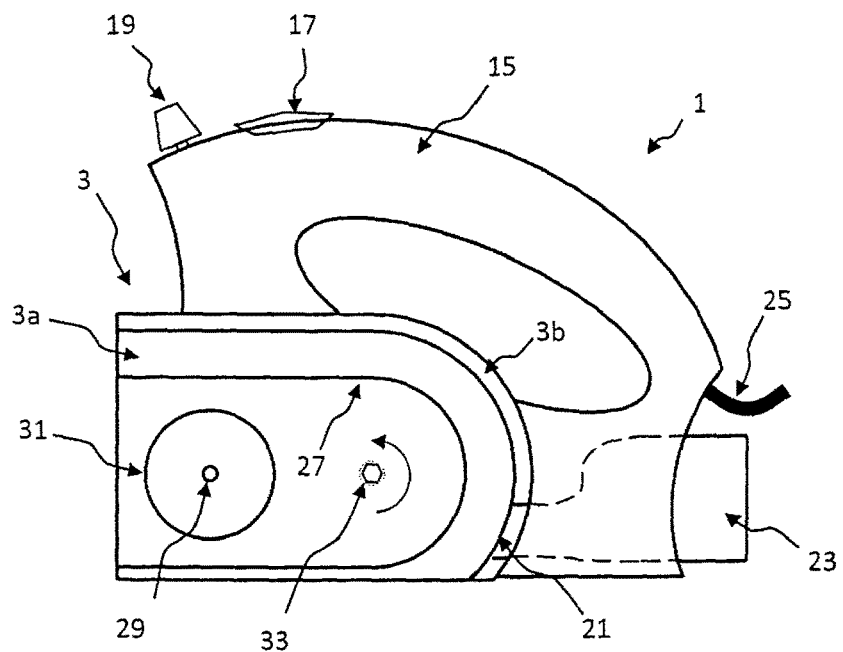
FIG. 1b shows a schematic diagram of an embodiment of the brush device according to the invention in a view in which a brush cassette is removed from the cassette holder.

FIG. 1b shows by way of schematic diagram the embodiment of the brush device 1 according to the invention in a view which shows the side of the brush device 1 that is opposite to that in the view of FIG. 1a. In the view of FIG. 1b, the brush cassette 5 is removed from the cassette holder 3 and is therefore not shown. The side wall 3a of the cassette holder 3 has a recess 27 for receiving part of the brush cassette 5. The recess 27 has substantially the shape of a brush cassette 5 and has a depth of e.g. 3 mm, as a result of which a brush cassette 5 is partially buried in this recess 27 when the brush cassette 5 has been inserted and is thus held in the position provided by the recess 27. A motor axle of a drive motor 31 mounted on the side wall 3a runs vertically through the side wall 3a. The rotation of the motor axle is transmitted to a drive pin 33 via a transmission 13 (see FIGS. 1a and 1c) mounted on the rear side of the side wall 3a, said drive pin being made as an external hexagon. This drive pin 33 serves to couple the drive axle 35 of a brush cassette 5 when it is inserted into the cassette holder 3. A locking pin 29 is attached to the housing of the drive motor 31 and is vertical to the side wall 3a of the cassette holder 3. The cassette holder 3 is closed on the upper side and rear side by a rear wall 3b, which has a curved surface. The handle 15 including the switch 17, the power regulator 19 and the electric cable 25 is mounted on this rear wall 3b. The rear end of the rear wall 3b has a suction opening 21 which opens into the suction channel 23.

Figure 1C:
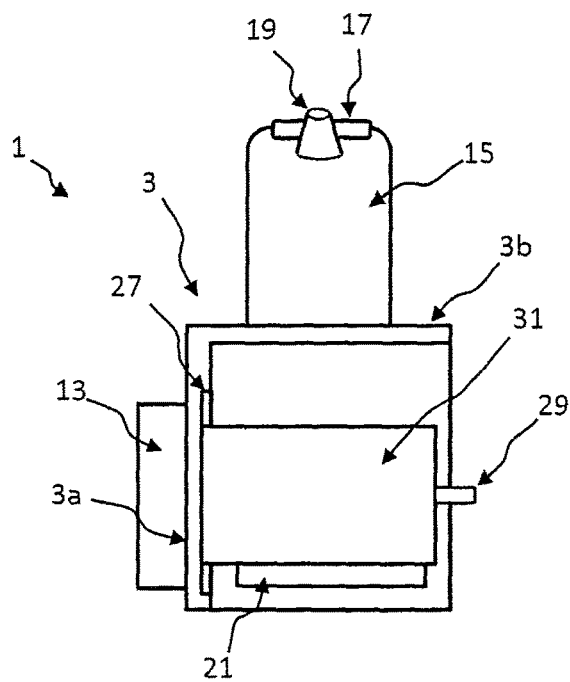
FIG. 1c shows a schematic diagram of an embodiment of the brush device according to the invention in a front view.

FIG. 1 shows by way of schematic diagram the embodiment of the brush device 1 according to the invention in a front view. In this view, the brush cassette 5 is also removed and therefore not shown. FIG. 1c shows the transmission housing 13 which is mounted on the outer side of the side wall 3a of the cassette holder 3 and accommodates a transmission. The transmission housing 13 and/or the transmission is mounted opposite to the drive motor 31. The drive motor 31 is made as an electric motor. Only the motor housing is shown by way of diagram in the figures. A motor axle of the drive motor 31 extends into the transmission housing 13 and couples to the transmission disposed therein.

Figure 2A:
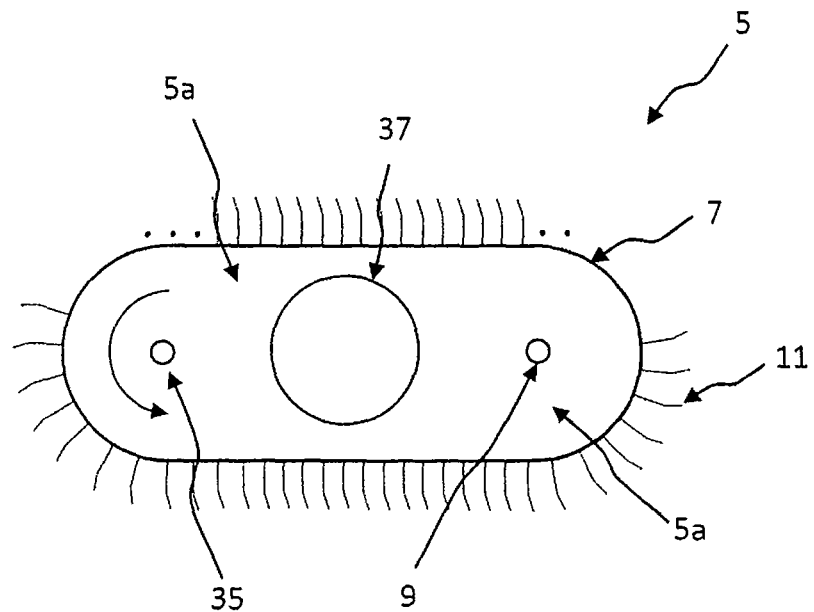
FIGS. 2a and 2b show a schematic diagram of a side view and a front view of an embodiment of a brush cassette, respectively.
Figure 2B:
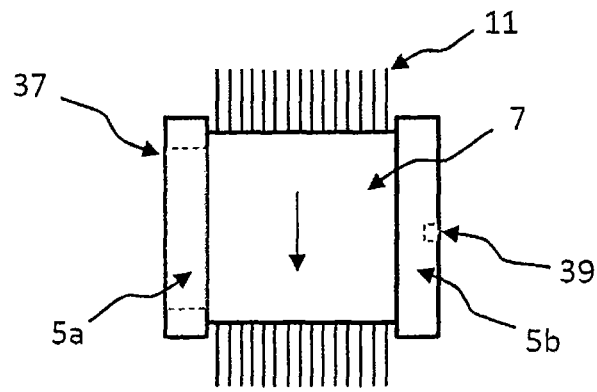

FIGS. 2a and 2b show by way of schematic diagram a side view and a front view of an embodiment of a brush cassette 5. The brush cassette 5 is shown in a state in which it was removed from the cassette holder 3. The brush cassette 5 comprises a brush belt 7, which is equipped with fitting material 11 that is here made as bristles from spring steel wire. The brush cassette 5 is confined on both longitudinal sides by a side wall 5a and 5b, respectively. The side view of FIG. 2a shows the side wall 5a of the brush cassette 5 which meshes with the recess 27 of the side wall 3a (see FIG. 1b) of the cassette holder 3 when the brush cassette 5 is inserted into the cassette holder 3. A drive axle 35 is connected to a driving roller (45 in FIGS. 4a and 4b). The drive axle 35 is designed in such a way that, when the brush cassette 5 is inserted into the cassette holder 3, the drive pin 33 meshes with the drive axle 35. FIG. 2a also shows a revolving roller axle 9 which is supported in the side walls 5a and 5b of the brush cassette 5 and which is connected to a revolving roller (43 in FIGS. 4a and 4b) and rotatably mounts the latter in the brush cassette 5. A brush belt 7 equipped with fitting material 11 revolves around the driving roller and deflection roller. The side wall 5a of the brush cassette 5 also has a motor insertion opening 37, through which the drive motor 31 is inserted into the brush cassette 5 when the brush cassette 5 is inserted into the cassette holder 3. In the front view of FIG. 2b, the insertion opening 37 is shown in dashed line. In the embodiment of the brush device 1 shown herein, the drive motor 31 has a cylindrical shape, such that the motor insertion opening 37 is made as a circular hole in the cassette wall 5a.

Furthermore, the front view of FIG. 2b also shows a locking opening 39 in the side wall 5b of the brush cassette 5. When the brush cassette 5 is inserted into the cassette holder 3, the locking pin 29 is inserted into this locking opening 39 and is guided through the side wall 5b. The locking opening 39 fully penetrates the side wall 5b. In FIG. 2b, the shown thickness of the side wall 5b also comprises a protrusion which merely exists in the outer edge region of the side wall. However, in the inner region, the side wall 5b has a thickness which corresponds to the locking opening 39. The side wall 5a of the brush cassette 5 likewise has a protrusion in the outer edge region.

Finally, a revolving direction of the brush belt 7 is outlined in FIGS. 2a and 2b by an arrow.

Figure 3:
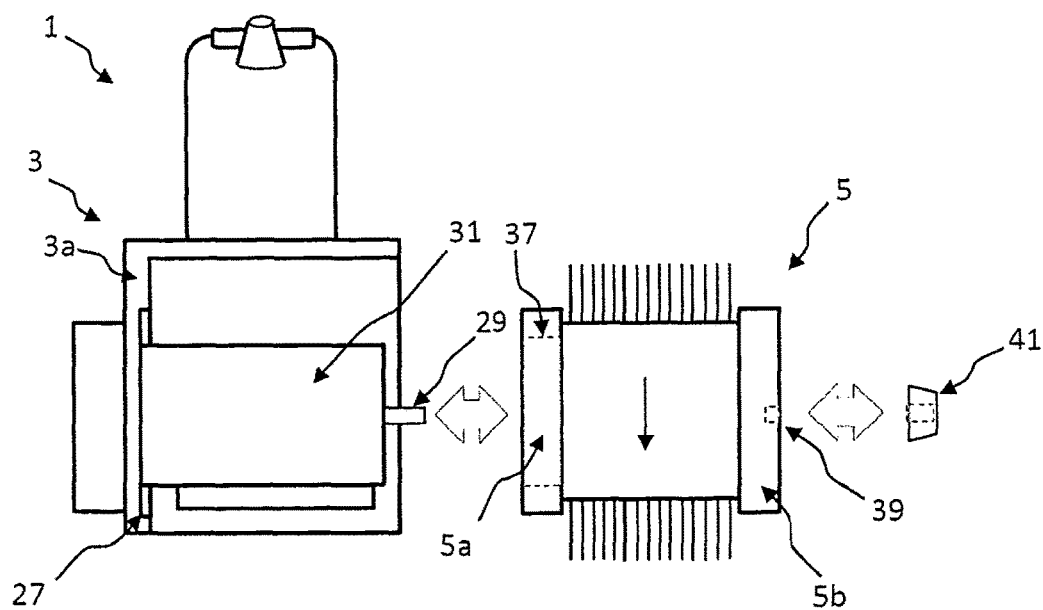
FIG. 3 shows schematically the insertion of a brush cassette into a cassette holder and the removal therefrom.

FIG. 3 shows by way of diagram the insertion of the brush cassette 5 into the cassette holder 3 and the removal therefrom. In order to insert the brush cassette 5 into the cassette holder 3, the brush cassette 5 is inserted into the cassette holder 3 via an open side of the cassette holder 3 (in FIG. 3 from the right), and therefore the drive motor 31 is inserted into the brush cassette 5 through the motor insertion opening 37 of the brush cassette 5. When the brush cassette 5 has been fully inserted into the cassette holder 3, part of the side wall 5a of the brush cassette is buried in form fit fashion in the recess 19 in the side wall 3a of the cassette holder 3, said recess being provided for this purpose. The locking pin 29, which is firmly connected to the housing of the drive motor 31, is inserted into the locking opening 39 of the side wall 5b of the brush cassette 5 when the brush cassette 5 is inserted and is guided through the opening, as a result of which the locking pin 29 protrudes through the side wall 5b when the brush cassette 5 is in its inserted state. Having inserted the brush cassette 5 into the cassette holder 3, the brush cassette 5 is locked by means of a locking screw 41 which is screwed onto the locking pin 29 protruding from the side wall 5b. For this purpose, the locking screw 41 has an internal thread which meshes with an external thread on the locking pin 29.

Figure 4A:
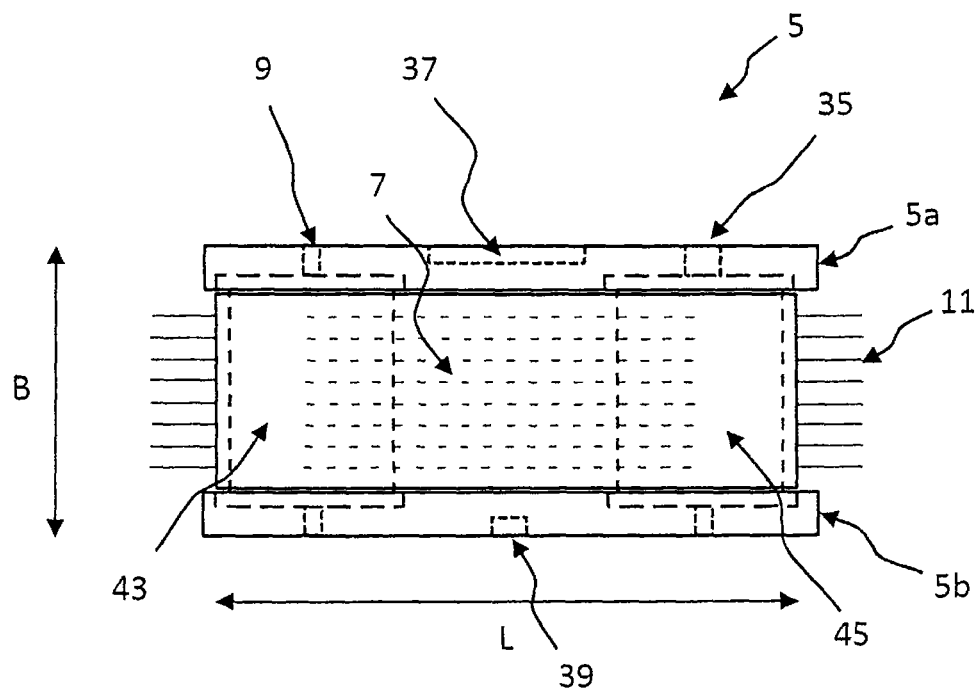
FIGS. 4a, 4b and 4c show a top view, a side view and a front view of an embodiment of the brush cassette, respectively.
Figure 4B:
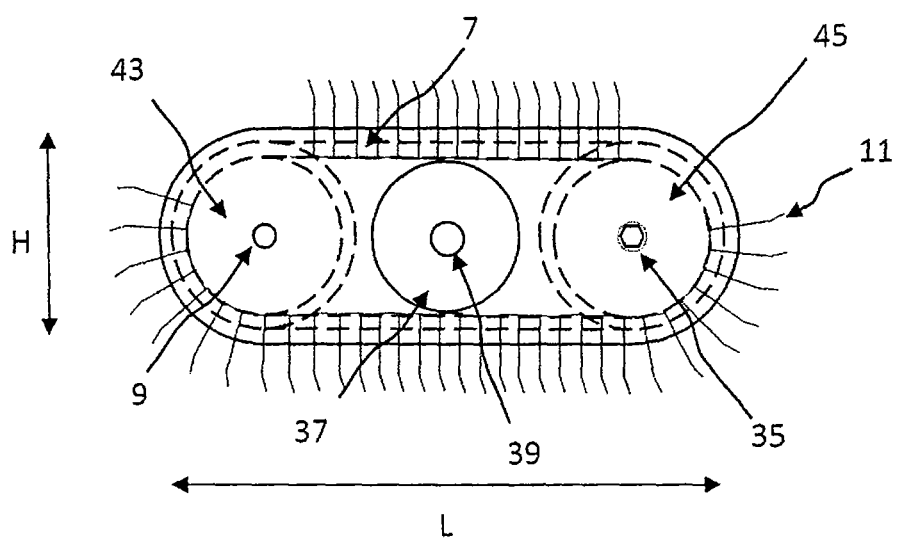
Figure 4C:
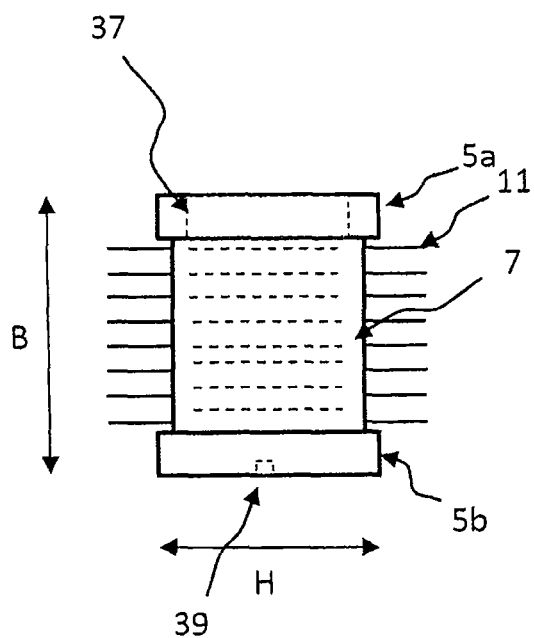

FIGS. 4a, 4b and 4c show a top view, a side view and a front view of a first embodiment of the brush cassette 5, respectively. The top view of FIG. 4a and the side view of FIG. 4b show in a dashed line schematically the revolving roller 43 disposed in the interior of the brush cassette 5 and the driving roller 45. The two lateral edge portions of the revolving roller 43 and the driving roller 45 have a protrusion and thus a somewhat larger diameter compared to the central region, and therefore the brush belt 7, which is shown in dashed line in FIG. 4b, is safely transported. The fitting material 11 penetrates the brush belt 7. The driving roller shows the driving roller axle 35 which has a depression in the form of hexagonal recess with which the drive pin 33 of the cassette holder 5 can mesh. The side view of FIG. 4b shows in the center of the brush cassette 5 the motor insertion opening 37 in the side wall 5a and the cassette locking mechanism 39 disposed on the opposite side 5b. The brush cassette 5 of this embodiment has an exemplary length L of 15 cm, an exemplary width B of 7 cm and an exemplary height H of 5 cm. The outer edge regions of side walls 5a and 5b of the brush cassette 5 have a protrusion, as a result of which the revolving roller 43 and the driving roller 45 are shown in FIG. 4a in a way partially covered by this protrusion. In the inner region, the thickness of the two side walls 5a and 5b corresponds to the depths of the openings 37 and 39, respectively, as a result of which these openings 37 and 39 fully penetrate the side walls 5a and 5b, respectively.

Figure 5A:
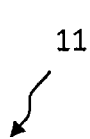
FIGS. 5a, 5b and 5c show a side view, a front view and a top view of an embodiment for trimming material, respectively.
Figure 5B:
Figure 5C:

FIGS. 5a, 5b and 5c show a side view, a front view and a top view of an embodiment for the fitting material 11, respectively. The exemplary fitting material 11 is spring steel wire which has a length of about 4 cm and has a round body. The spring steel wire has a U-shaped bend as shown in the front view of FIG. 5b. The spring steel wire has a horizontal bend in the horizontal, lower central part of the U-shaped wire, as shown in the top view of FIG. 5c. In this embodiment, the bend has an exemplary angle of about 90°. As shown in the side view of FIG. 5a, the ends of the spring steel wire are slightly bent rearwards. The bending angle is here e.g. 30° and the rearward bent parts of the spring steel wire each have a length of about 3 mm. In order to avoid scratching of the spring steel wire, the ends of the spring steel wire are rounded. The spring steel wire is inserted into a brush belt 7 from below, as a result of which the horizontal, lower central part of the U-shaped wire rests on the brush belt 7. Therefore, the U-shaped spring steel wire inserted in such a way realizes two bristles for the coat care of domestic animals on the outer side of the brush belt 7.

Figure 6A:
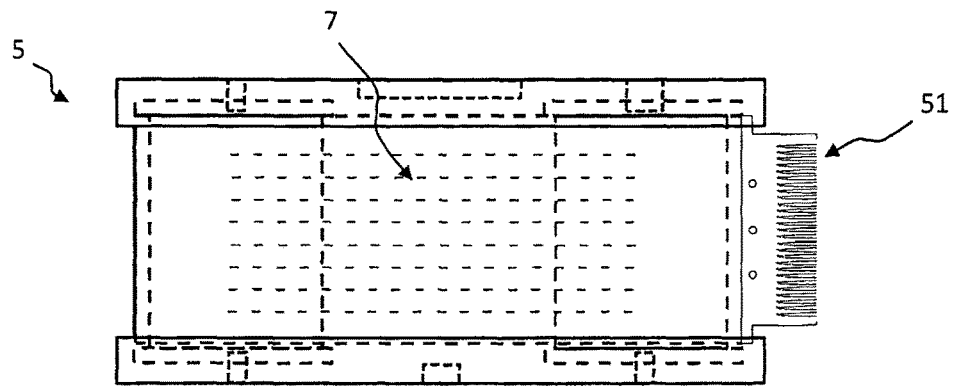
FIGS. 6a, 6b and 6c show a top view, a side view and a front view of a further embodiment of a brush cassette, respectively.
Figure 6B:
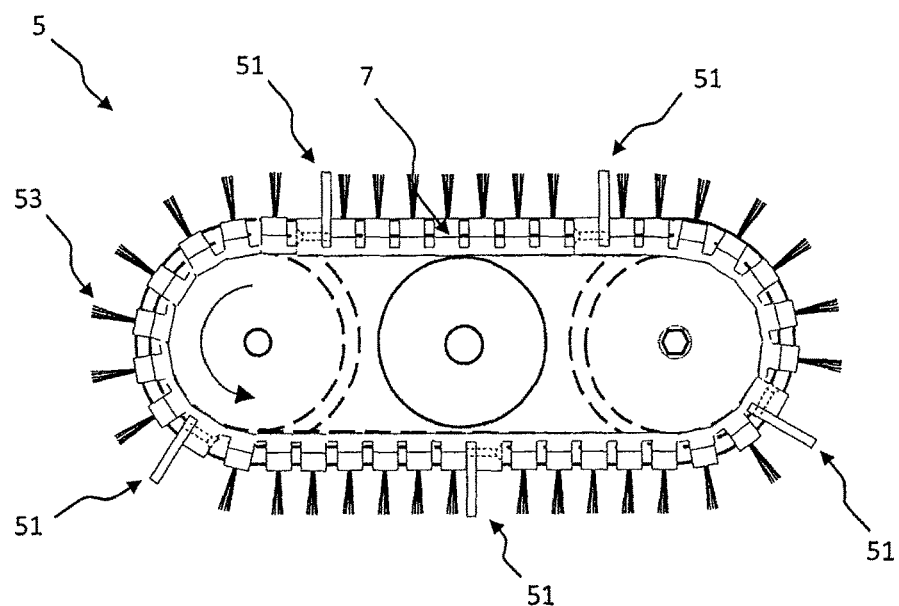
Figure 6C:
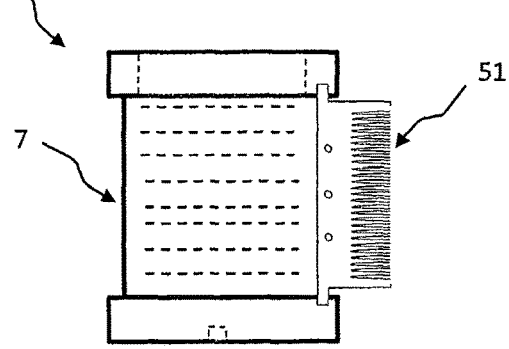

FIGS. 6a, 6b and 6c show a top view, a side view and a front view of a further embodiment of a brush cassette 5, respectively. The brush cassette 5 of FIGS. 6a, 6b and 6c differs from the brush cassette 5 of FIGS. 4a, 4b and 4c merely in that an alternative embodiment of a brush belt 7 is used. The alternative brush belt 7 is an endless flat belt which is equipped with comb elements 51 which are mounted on the brush belt 7 in such a way that they are disposed substantially transversely to the running direction and are substantially perpendicular to the surface of the brush belt 7. This brush belt 7 is particularly suited to thin out undercoat or remove dead hair effectively and rapidly from the coat.

Five comb elements 51 are shown in the side view of FIG. 6b and are arranged on the brush belt 7 at approximately equal distances. The brush belt 7 is equipped with bristle bundles 53 between the comb elements 51, said bristle bundles being designed in such a way that they protrude from the brush belt approximately as much as the corresponding teeth 55 of the comb elements 51. A bristle bundle 53 consists e.g. of a plurality of natural or plastic fibers, e.g. nylon. For the purpose of simplification, FIGS. 6a and 6c only show one comb element 51 each. The bristle bundles 53 serve to render possible the most uniform contact pressure of the brush belt 7 on the coat, which makes the treatment more pleasant. In alternative embodiments, the bristle bundles 53 can also be omitted.

Figure 7:
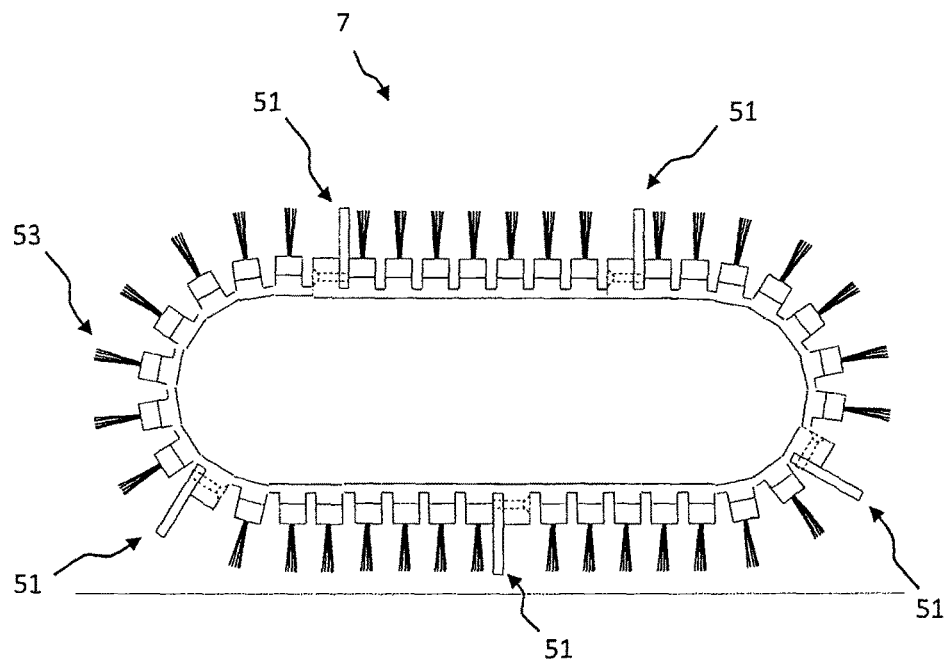
FIG. 7 shows an exemplary brush belt in a state in which it is removed from the brush cassette.

FIG. 7 shows the brush belt 7 used in the brush cassette 5 of FIGS. 6a, 6b and 6c in a state in which it is removed from the brush cassette 5 (not shown in FIG. 7). The brush belt 7 of FIG. 7 is equipped with comb elements 51 and is used in an electric flat belt brush or cassette brush (see FIGS. 6a, 6b, 6c) which drives the belt. Hair, undercoat, soiling and other particles can be vacuumed off continuously in the brush region during brushing, as described above in connection with the brush device of FIGS. 1 to 5.

Figure 8:
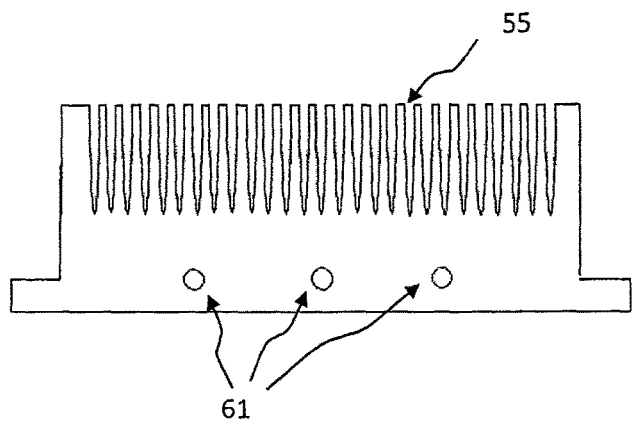
FIG. 8 shows an exemplary comb element.

FIG. 8 shows a front view of a comb element 51. The comb element 51 has a plurality of teeth 55. The comb element 51 can be made of plastics or metal. The intermediate spaces between the teeth preferably become narrower towards the end. The length of the teeth and/or slits and the width can vary depending on the field of application (long-haired coat, short-haired coat or coat type). The comb element 51 also has bores 61 which are provided e.g. with screws or pins (e.g. plastic pins or spring bars) like a screw or plug connection in order to attach the comb element 51 to a cam (see 59 in FIGS. 10a and 10b).

Figure 9:
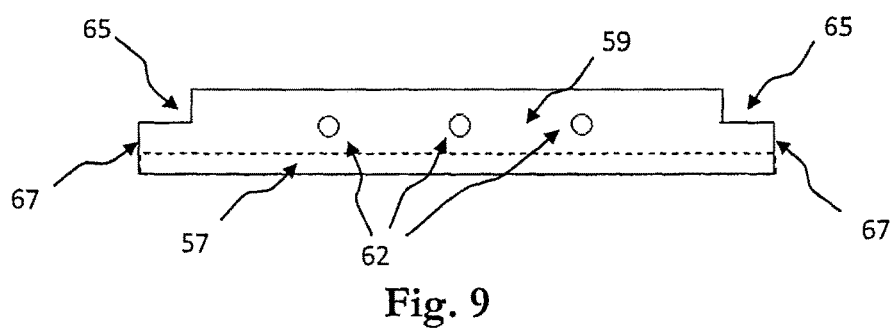
FIG. 9 shows a cam which is attached to a basic belt.

FIG. 9 shows a cam 59 on a basic belt 57 (flat belt), to which a comb element 51 can be attached. The cam 59 has bores 62, which serve to attach a comb element 51. An upper half of the cam 59 has lateral cam recesses 65, which run in the running direction of the strip. This leads in a lower half of the basic belt 57 to corresponding lateral cam protrusions 67 which mesh with the side walls of the brush cassette 5 (cf. 5a and 5b of FIG. 4a), and therefore the basic belt 57 and/or the brush belt 7 on the brush cassette 5 is held in position while revolving. The cam 59 can consist of a material, e.g. a plastic material, which is harder than the material of the basic belt on which it is mounted. Thus, the cam 59 offers a stable attachment possibility for the comb element 51 and the basic belt 57 offers sufficient flexibility for an easy run around the rollers. In one embodiment, a compact polyurethane plastics SNE of hardness 80 ShA is used as the material of the cam 59, whereas a polyurethane plastics PU of hardness 60-70 ShA is used as a material of the basic belt 57.

Figure 10A:
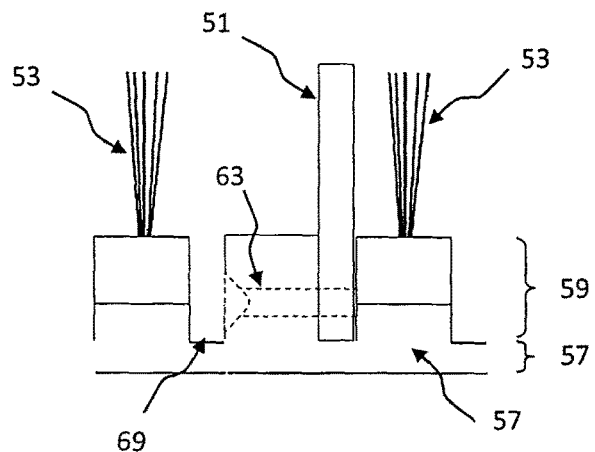
FIGS. 10a and 10b show how to attach a comb element to a cam.
Figure 10B:
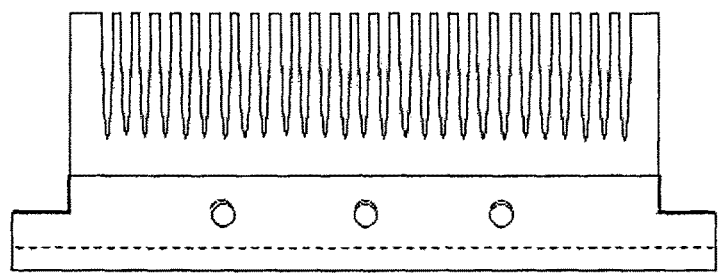

The cross-sectional view of FIG. 10a and the front view of FIG. 10b show how to firmly connect a comb element 1 to a cam 59 by inserting a screw or a pin 63 into a bore (61, 62 in FIGS. 8 and 9). Furthermore, FIG. 10a shows two adjacent cams, each equipped with a bristle element 53.

Figure 11:
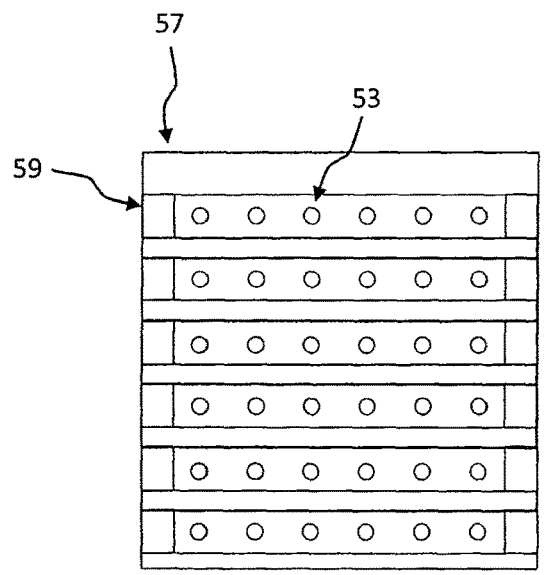
FIG. 11 shows a top view of a segment of an exemplary brush belt in FIG. 7.

Finally, FIG. 11 shows a top view of a partial view of the brush belt 7. A plurality of cams 59 are attached to a flat belt 57 and are equipped with respective bristle bundles 53. The top view of FIG. 11 does not show any comb elements 51 for reasons of simplification.

LIST OF REFERENCE SIGNS 1 brush device
3 cassette holder
3a side wall of the cassette holder
3b rear wall of the cassette holder
5 brush cassette
5a side wall of the brush cassette
5b side wall of the brush cassette
7 brush belt
9 revolving roller axle
11 fitting material
13 transmission with transmission housing
15 handle
17 switch (forward-stop-reverse)
19 power regulator
21 suction opening
23 suction channel
25 electric cable
27 recess for positioning the brush cassette
29 locking pin
31 drive motor with drive motor housing
33 drive pin
35 drive axle
37 motor insertion opening of the brush cassette
39 locking opening
41 locking screw
43 revolving roller
45 driving roller
51 comb element
53 bristle bundle
55 teeth of the comb element 57 basic belt
59 cam
61 bores in the comb element
62 bores in the cam
63 screw or pin
65 cam recess
67 cam protrusion

The invention claimed is:

1. A handheld brush device for caring for coat and skin of animals, the brush device comprising:
   (a) a cassette holder including a recess;
   (b) a brush cassette including:
      i. a drivable brush belt and
      ii. an opening; and
   (c) a drive motor;
   wherein:
   1) the drive motor is mechanically coupled to the cassette holder;
   2) the brush cassette is configured to be selectively contained within or removed from the recess in the cassette holder; and
   3) the opening in the brush cassette is configured to allow insertion of the drive motor into the brush cassette when the brush cassette is inserted into the recess.

2. The brush device of claim 1, the brush cassette further comprising a drive axle configured to drive the brush belt and wherein the cassette holder supports a drive pin to mechanically couple to the drive axle of the brush cassette, wherein the drive pin is configured to mesh with the drive axle when the brush cassette is received into the cassette holder.

3. The brush device of claim 2, wherein the brush cassette further comprises two rollers and the brush belt is configured to run around the two rollers, wherein at least one of the two rollers is a driving roller connected to the drive axle of the brush cassette, wherein said drive axle is configured to transmit force to the driving roller when the brush cassette is received in the cassette holder.

4. The brush device of claim 2, further comprising a transmission attached to the cassette holder, wherein the transmission operably couples the drive motor to the drive axle and the drive pin.

5. The brush device of claim 1, further comprising a locking mechanism that is configured to lock the brush cassette and the cassette holder together when the brush cassette is received into the cassette holder.

6. The brush device of claim 5, wherein the brush belt has a basic belt strip on which one or more comb elements are mounted in such a way that they are substantially transverse to a running direction of the basic belt strip and are substantially perpendicular to a surface of the basic belt strip.

7. Use of the brush device according to claim 1 for brushing, combing, grooming, massaging or detangling, in particular for coat and skin care of domestic animals.

8. A brush cassette system comprising the brush device of claim 1, the brush cassette system including a plurality of brush cassettes, wherein:
   (a) each of the brush cassettes has various discrete brush belts; and
   (b) the cassette holder is configured to exchangeably receive the plurality of brush cassettes.

* * * * *